July 1, 1958      L. C. OSBORN      2,841,250
VEHICLE EMERGENCY BRAKE
Filed April 30, 1956      2 Sheets-Sheet 1
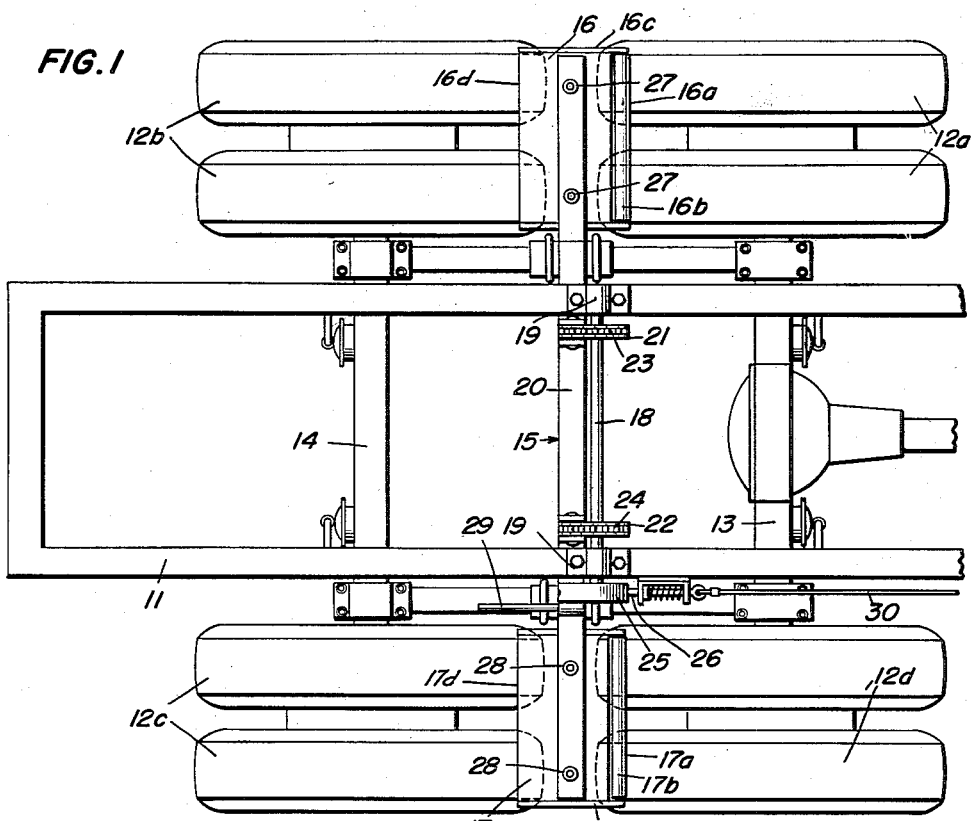
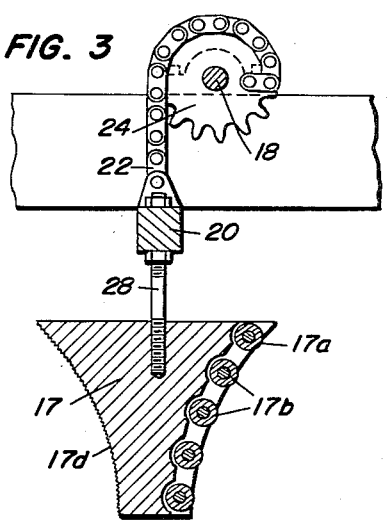
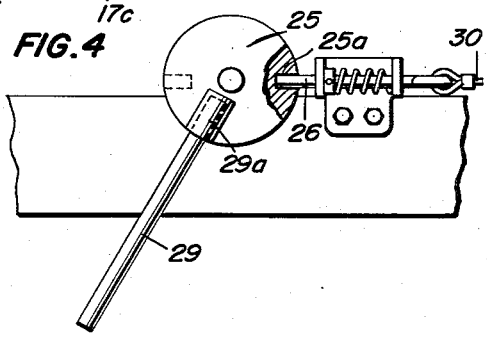
INVENTOR
Leonard C. Osborn
BY *John B. [signature]*
ATTORNEY INVENTOR
Leonard C. Osborn United States Patent Office 2,841,250
Patented July 1, 1958

2,841,250

VEHICLE EMERGENCY BRAKE

Leonard C. Osborn, Salt Lake City, Utah

Application April 30, 1956, Serial No. 581,677

4 Claims. (Cl. 188—2)

This invention relates to vehicle emergency brakes, and more especially to brakes for acting on a pair of ground wheels situated in tandem and spaced a short distance from each other longitudinally of the vehicle.

An object of this invention is the provision of an emergency brake which is readily useful on vehicles having mechanical, pneumatic or hydraulic brakes for ordinary use, the emergency brake being well suited for being held in reserve in the event of failure of the main braking system and in the event of emergency may be released and acts in a thoroughly effective manner to bring the vehicle to an emergency halt.

Another object of this invention is that of providing a highly satisfactory vehicle emergency brake which in operation is applied by force developed between at least one of the vehicle ground wheels and a friction surface of the brake.

Another object of this invention is the provision of an emergency brake of the character indicated which effectively stops the vehicle under emergency conditions and yet is readily released from its position of full braking action.

A further object is the provision of an emergency vehicle brake having positive and reliable braking effect in the instance of being applied between tandem wheels of vehicles such as of the heavy type, acting between the wheels in a stable and positive manner and cooperating with the wheels to achieve the desired emergency measure.

A still further object of this invention is the provision of an emergency stopping device which is easily mounted on a vehicle to function between and against pairs of ground wheels in which the wheels in each pair are aligned with each other and spaced a short distance from each other longitudinally of the vehicle and arranged so that the pairs of wheels are directly opposite each other on opposite sides of the vehicle on corresponding axles.

Another object is that of providing an emergency stopping device which is readily put into service to act on closely paired ground wheels of a vehicle, the pairs of wheels being in tandem and spaced only a short distance from each other longitudinally of the vehicle.

A further object is the provision of a practical and inexpensive emergency brake which is easy to produce, install, control and maintain.

Other objects of this invention in part will be obvious and in part more fully pointed out hereinafter.

The invention accordingly consists in the combination of elements, features of construction and operation and in the relation of each of the same of one or more of the others as described herein, the scope of the application of which is pointed out in the following claims.

In the accompanying drawing, representing a preferred embodiment of the present invention:

Figure 1 depicts in plan view the rear of a vehicle chassis on which an emergency brake in accordance with the invention is installed;

Figure 3 is a detail of brake control mechanism used in Figure 1; and

Figure 4 is a detail of detent means forming a portion of the brake.

Like reference characters denote like parts throughout the several figures of the drawing.

Figure 2:
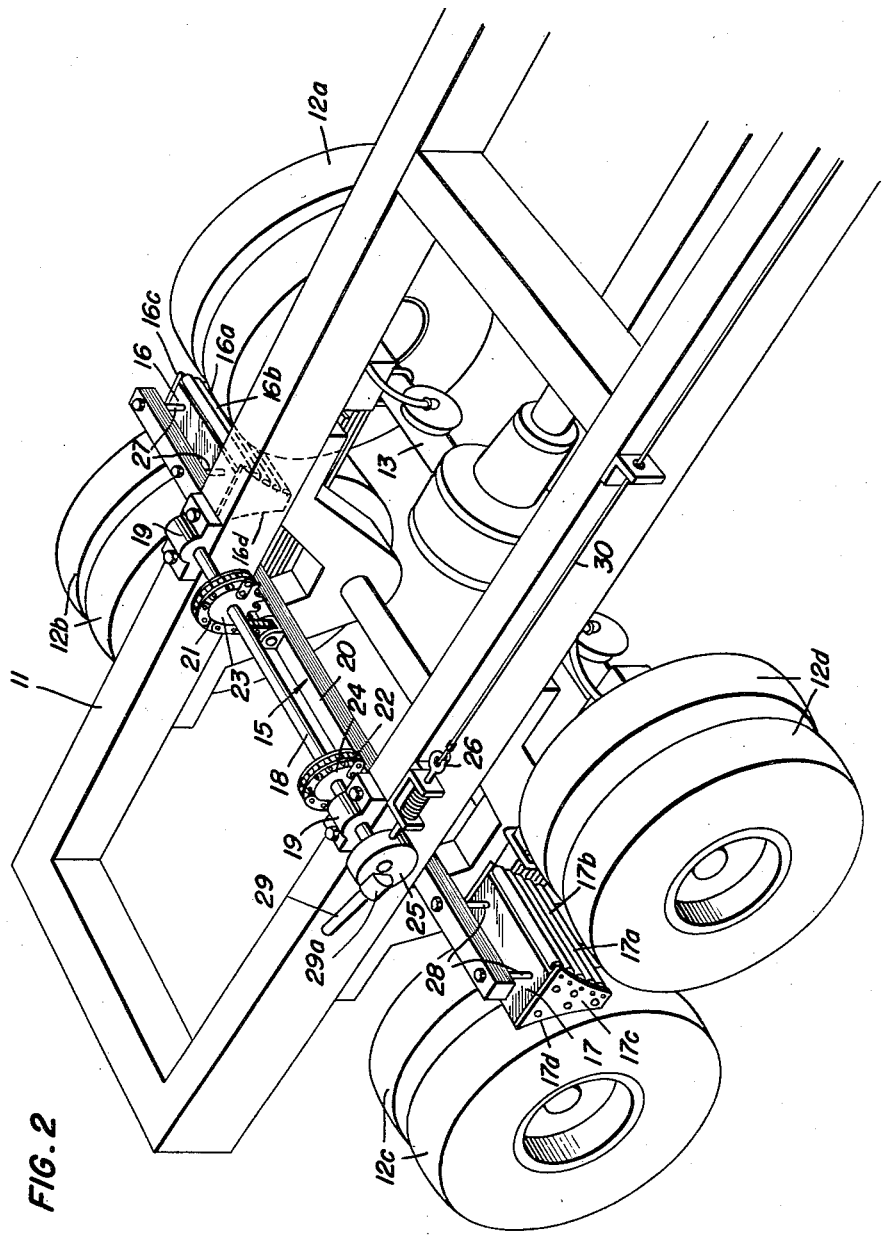
Figure 2 is an isometric representation of the brake and vehicle structure corresponding to Figure 1.

As conducive to a clearer understanding of certain features of the invention, it may be noted at this point that many approved braking systems whether of a mechanical, pneumatic or hydraulic type are being installed and used on any of a variety of motor vehicles, but it remains that on occasions these systems have failed to function, resulting in loss of life and property. There has been an increasing demand for vehicles of greater weight and size and this often has made it necessary for the manufacturers of these vehicles to provide an increased number of axles and wheels in order to meet the maximum wheel load specifications established by agencies controlling vehicle design. In the field of manufacture of buses, trailers and trailer trucks, tow-trucks and the like, for example, it has become a well known practice to afford at least four wheels in closely grouped tandem pairs on opposite sides of the vehicle such as at the rear. Thus, while brakes of the mechanical, pneumatic or hydraulic type are customarily used on tandem wheel installations of the sort just mentioned, and ordinarily give satisfactory performance, it has become highly desirable to supplement such braking systems with an emergency brake which co-acts with the tandem wheels in the event of main brake failure. In many instances, emergency brakes heretofore known do not develop a sufficiently large braking force to serve on heavy equipment and it is also true that many of the available emergency brakes otherwise do not lend themselves to any particular advantage on vehicles where tandem wheel installations are present.

An outstanding object of this invention accordingly is the provision of a practical, positive and powerful emergency brake which is well suited for acting directly on the tandem wheels of heavy motor vehicles, which brake includes a minimum of parts yet is satisfactory in operation and is easy to control.

Referring now more particularly to the practice of the present invention, I provide an emergency brake for vehicles in which the brake includes a brake shoe in the form of a wedge-shaped block supported on the vehicle body for vertical movement into the space between a pair of tandem ground wheels of the vehicle. Opposite wedge faces of the block respectively correspond to front and rear wheels of the tandem wheels, one of the wedge faces having relatively high-friction properties as compared with the opposite wedge face. When the wedge-shaped block is released for the emergency braking action, a wheel of the pair of ground wheels is contacted by the relatively high-friction face of the block and that ground wheel frictionally drives the block into the space between the tandem wheels, developing greater friction and accordingly an increased braking action. The opposite wedge face of the block in presenting a relatively low-friction face to the other wheel of the tandem pair prevents friction forces from developing at the latter wheel which otherwise could act to drive the block in a direction cancelling the braking force.

In the accompanying drawing, representing a preferred embodiment of this invention, a vehicle designated generally by the reference numeral 10 includes a chassis or frame 11 and rear wheels 12 are in tandem pairs for supporting the rear of the vehicle body. Wheels 12 are for example of a pneumatic rubber or synthetic rubber tire variety having the usual peripheral anti-skid treads. It will be seen that more specifically the wheels are in double tandem pairs 12a and 12b on one side of the vehicle and in double tandem pairs 12c and 12d on the other side of the vehicle. Pairs 12a and 12d are supported on axle 13 and pairs 12b and 12c are on axle 14. The axles are suitably suspended from the chassis 11 such as by the usual springs and at least one of the axles is supplied with power from the motor of the vehicle by usual drive shaft and differential gear. An ordinary brake system such as of the mechanical, hydraulic or pneumatic type is relied upon for stopping the vehicle when emergency conditions are not encountered to demand supplemental or substituted emergency braking.

The rear wheels 12 of the vehicle are equipped with an emergency brake 15 which comprises wedge-shaped brake shoes 16 and 17 respectively poised above the space between tandem wheels 12a and 12b and the space between tandem wheels 12c and 12d and are supported from a control shaft 18 rotatably secured to the chassis 11 by journal brackets 19. Shoes 16 and 17 are interconnected by a cross bar 20 which at one end is equipped with spaced vertically-depending rods 27 having their lower ends firmly secured to the shoe 16 and the opposite end of the bar has spaced vertically depending rods 28 firmly secured to brake shoe 17. In further particular, shoe 16 is suspended from control shaft 18 by a sprocket chain 21 and shoe 17 likewise is suspended between the wheels to which it corresponds by a sprocket chain 22. Corresponding ends of the sprocket chains 21 and 22 are fastened to sprockets 23 and 24, respectively affixed to rotate with the control shaft 18 and the other ends of the sprocket chains are connected to the cross bar 20, the effective lengths of the chains preferably being equal so that the shoes 16 and 17 may be raised and lowered with equal affect with respect to the tandem wheels. The control shaft 18 is provided with a detent mechanism and the mechanism conveniently includes a detent wheel 25 secured to one end of the control shaft 18. Detent wheel 25 has at least one cavity 27 in the rim thereof and there is a corresponding spring-biased stop pin element 26 situated on the vehicle chassis 11 opposite the rim of the wheel. The biasing spring of the pin serves to load the pin into the wheel cavity 25a thus stopping rotation of the control shaft 18 in the disengaged position of the emergency brake. A lever 29 is provided extending radially from shaft 18 and connected to detent wheel 25 such as by quick-detachable coupling 29a so that the detent wheel, shaft 18 and sprockets 23 and 24 may be rotated as a unit.

Brake shoes 16 and 17 have low-friction faces 16a and 17a adjacent to forward wheels 12a and 12d of the tandem pairs of wheels as compared with relatively high-friction faces 16d and 17d. In the embodiment preferred, faces 16a and 17a include side by side anti-friction roller bearings 16b and 17b having axes of rotation substantially parallel to the axes of the ground wheels 12. Rollers 16b are journaled at their ends in apertures extending through end plates 16c on brake shoe 16 and likewise rollers 17b are journaled at their ends in apertures extending through end plates 17c on brake shoe 17. The apertures in end plates 16c and 17c are illustratively in curved paths on the respective plates and the curvature is for example substantially the same as the peripheral curvature of the wheels 12 thus placing the rollers 16b and 17b in positions where the rollers substantially outline the curvature of the ground wheels. Faces 16d and 17d, respectively, are opposite the faces 16a and 17a on the brake shoes, and preferably also are curved producing faces which substantially conform to the peripheral curvature of rear wheels 12b and 12c in the groups of tandem wheels. Faces 16d and 17d are made such as of knurled or roughened wood or metal or even are smooth high-friction surfaces resulting from the shoes being of or faced with the desired high-friction material, and in being relatively high-friction faces as compared with the anti-friction faces are capable of exerting a highly effectively braking action against those ground wheels which they contact in operation. Low-friction faces 16a and 17a and high-friction faces 16d and 17d in substantially conforming to the peripheries of their related ground wheels may if desired be on a somewhat larger radius as compared with the radius of the ground wheels or otherwise may be acutely wedged so that the brake shoes 16 and 17 have an increased tendency to penetrate farther into the spaces between the ground wheels during the emergency braking operation.

In the embodiment just described, emergency brake 15 may be set and held out of action, pending emergency conditions, by rotating lever 29 on the detent wheel 25 in a clockwise direction in Figure 2. This rotation is accompanied by rotation of shaft 18 and sprocket wheels 23 and 24. Chains 21 and 22 accordingly are wound on the sprockets and cross bar 20 supporting the brake shoes 16 and 17 at its opposite ends is elevated along with the shoes, freeing the shoes from contact with the ground wheels 12. Latch pin 26 is set into cavity 25a on the detent wheel 25 and this serves to hold shaft 18 against rotation and to sustain the brake shoes and their supporting cross bar 20 in the elevated position pending emergency need for operation. A control link such as wire 30 interconnects latch pin 26 with a control lever or the like (not shown) which may be operated by the driver of the vehicle from some point remote from the emergency brake. In the event emergency conditions arise, wire 30 is pulled to free latch pin 26 from the detent wheel 25 and the brake structure suspended from sprocket wheels 23 and 24 immediately lowers such as by gravity allowing the brake shoes 16 and 17 to move wedge-fashion into the spaces between the tandem wheels and into contact with the wheels. Wheels 12b and 12c under conditions of forward movement of the vehicle frictionally engage the relatively high friction faces 16d and 17d of the brake shoes and urge the shoes downward increasing the emergency braking force and, as the braking force increases, friction between wheels 12b and 12c and the faces 16d and 17d increases. The braking force accordingly is further intensified bringing the vehicle rapidly and positively to a halt. During braking, the forward anti-friction faces 16a and 17a present the rollers 16b and 17b to the peripheral surfaces of wheels 12a and 12d. The rotation of wheels 12a and 12d ordinarily would tend to lift brake shoes 16 and 17 in a manner cancelling the braking effect at faces 16d and 17d; however, under the anti-friction conditions afforded by the rollers, the frictional effect at faces 16d and 17d prevails and the brakes are applied. It will be seen that during the braking action, the ground wheels themselves act as guides for the brake shoes, lateral to the vertical path of movement of the shoes. After the vehicle has been stopped, it may be reversed and the ground wheel action on the brake shoes 16 and 17 likewise is reversed freeing the shoes and enabling lever 29 to be rotated such as by manually applied force to restore the brake to disengaged position maintained by the detent 26 until emergency conditions demand release. Detent 26, as provided in the present embodiment, apart from holding the brake shoes 16 and 17 out of engagement with the ground wheels 12 before an emergency, also functions as a downward movement limit stop after the shoes 16 and 17 are initially freed to move downward. Once the pin 26 has been withdrawn from the cavity 25a in detent wheel 25 the detent wheel rotates as the shoes descend, eventually aligning stop cavity 25a in the rim of the detent wheel with pin 26. The pin enters the cavity 25a and the downward descent of the shoes 16 and 17 is therefore arrested, although by then a sufficient braking force has developed between faces 16d and 17d of the shoes and ground wheels 12b and 12c to bring the vehicle to a halt. By having the lower limit stop act reasonably early following initial frictional engagement of the shoes with the wheels, extremely sudden halting of the vehicle is avoided. Other forms of limit stop means for downward movement of the shoes of course may be substituted; for example, by having chains 21 and 22 just long enough to limit the shoes 16 and 17 in ground wheel braking position with the chains fully unwound on the sprockets 23 and 24. It will also be understood that the provision of limit stop means for downward movement can on occasions be avoided such as by widening the tops of shoes 16 and 17 enough to arrest full passage downward between the adjacent ground wheels.

Thus it will be seen that in this invention there is provided an emergency brake for vehicles in which the various objects noted together with many thoroughly practical advantages are successfully achieved. It will be seen that the brake is easy to make and install and that it is highly reliable and effective in operation.

While considerable emphasis has been placed upon the use of an emergency brake having several brake shoes for acting on different pairs of wheels of the vehicle it will be understood that certain advantages still in accordance with the practice of this invention are had through the use of but one brake shoe such as might be installed on one side of a vehicle thus to act on one or more pairs of ground wheels.

As many possible embodiments of the invention may be made and as many changes may be made in the embodiment described, it will be distinctly understood that all matter hereinbefore set forth is to be interpreted as illustrative and not as a limitation.

I claim:

1. An emergency braking device for a vehicle having tandem wheels mounted thereon with the peripheral surfaces of said wheels opposed longitudinally of the vehicle, said device including a wedge-shape brake block having a high-friction wedge face and a relatively low-friction wedge face opposite each other and substantially conforming to the peripheral curvatures of said wheels, said high-friction wedge face being for high-friction driven engagement by the peripheral surface of one of said wheels in favor of said block being dynamically wedged between said opposed peripheral surfaces for a given direction of movement of the vehicle thus to achieve an emergency braking action, and said relatively low-friction wedge face resting on the directly opposite peripheral surface of the other of said wheels for said block thus to be supported at the relatively low-friction wedge face while the dynamic wedge-driving action at said high-friction wedge face prevails, means for moving said block to and away from said opposed peripheral surfaces of the wheels, and means for releasably holding said block in a disengaged position with respect to said wheels pending release of said block for emergency braking.

2. An emergency braking device for a vehicle having laterally opposed pairs of tandem wheels mounted on opposite sides thereof with the peripheral surfaces of the wheels in each of said pairs opposed longitudinally of the vehicle, said device including interconnected wedge-shape brake blocks corresponding to said pairs of wheels respectively, said blocks having on like sides high-friction wedge faces and relatively low-friction wedge faces on like opposite sides, said faces substantially conforming to the peripheral curvatures of said wheels and said high-friction wedge faces being for high-friction driven engagement by the peripheral surfaces of wheels occupying like relative positions in said pairs of wheels in favor of said blocks being dynamically wedged between said opposed peripheral surfaces of the other wheels of said pairs for a given direction of movement of the vehicle thus to achieve an emergency braking action, and the relatively low-friction wedge faces resting on the opposite peripheral surfaces of said other wheels for said blocks thus to be supported at the relatively low-friction wedge faces while the dynamic wedge-driving action at said high-friction wedge faces prevails, means for moving said interconnected blocks to and away from the corresponding pairs of wheels, and means for releasably holding said blocks in disengaged positions with respect to said wheels pending release of said blocks for emergency braking.

3. An emergency braking device for a vehicle having laterally opposed pairs of tandem wheels mounted on opposite sides thereof with the peripheral surfaces of the wheels in each of said pairs of wheels opposed longitudinally of the vehicle, said device comprising wedge-shape brake blocks over said pairs of wheels respectively and a cross bar interconnecting said blocks, said blocks having on like sides high-friction wedge faces and relatively low-friction wedge faces on like opposite sides, said faces substantially conforming to the peripheral curvatures of said wheels and said high-friction wedge faces being for high-friction driven engagement by the peripheral surfaces of wheels occupying like relative positions in said pairs of wheels in favor of said blocks being dynamically wedged between said opposed peripheral surfaces of the other wheels of said pairs for a given direction of movement of the vehicle thus to achieve an emergency braking action, and the relatively low-friction wedge faces resting on the directly opposite peripheral surfaces of said other wheels for said blocks thus to be supported at the relatively low-friction wedge faces while the dynamic wedge-driving action at said high-friction wedge faces prevails, a rotary control shaft journaled to said vehicle above said blocks, spaced connectors between said shaft and blocks, whereby said shaft may be rotated in one direction to lift said blocks away from said wheels and rotated in the opposite direction to lower said blocks onto said wheels for emergency braking, and detent means for holding said control shaft, spaced connectors, blocks and cross bar in brake disengaged position pending emergency release.

4. An emergency braking device for a vehicle having laterally opposed pairs of tandem wheels mounted on opposite sides thereof with the peripheral surfaces of the wheels in each of said pairs of wheels opposed longitudinally of the vehicle, said device comprising wedge-shape brake blocks over said pairs of wheels respectively and a cross bar interconnecting said blocks, said blocks having on like sides high-friction wedge faces and relatively low-friction wedge faces on like opposite sides, said faces substantially conforming to the peripheral curvatures of said wheels and said high-friction wedge faces being for high-friction driven engagement by the peripheral surfaces of wheels occupying like relative positions in said pairs of wheels in favor of said blocks being dynamically wedged between said opposed peripheral surfaces of the other wheels of said pairs for a given direction of movement of the vehicle thus to achieve an emergency braking action, and the relatively low-friction wedge faces resting on the directly opposite peripheral surfaces of said other wheels for said blocks thus to be supported at the relatively low-friction wedge faces while the dynamic wedge-driving action at said high-friction wedge faces prevails, a rotary control shaft journaled to said vehicle above said blocks, spaced sprockets on said shaft and rotatable therewith, spaced sprocket chains interconnecting said sprockets and said blocks, whereby said shaft may be rotated in one direction to wind said sprocket chains up on said sprockets to lift said blocks and rotated in the opposite direction to unwind said chains from the sprockets and lower said blocks onto said wheels for emergency braking, and detent means for holding said control shaft, chains and sprockets, blocks and cross bar in brake disengaged position pending emergency release.

References Cited in the file of this patent

UNITED STATES PATENTS

| | | |
|---|---|---|
| 655,505 | Morrow | Aug. 7, 1900 |
| 952,851 | Wagner | Mar. 22, 1910 |
| 2,658,587 | Velazquez | Nov. 10, 1953 |